May 10, 1960 J. POPA Re. 24,823

STARTING AND OPERATING CIRCUIT FOR ARC DISCHARGE DEVICE

Original Filed Dec. 26, 1956

Inventor:
John Popa,
by Robert G. Irish
His Attorney.

United States Patent Office

Re. 24,823
Reissued May 10, 1960

24,823

STARTING AND OPERATING CIRCUIT FOR ARC DISCHARGE DEVICE

John Popa, Lyndhurst, Va., assignor to General Electric Company, a corporation of New York Original No. 2,892,126, dated June 23, 1959, Serial No. 630,521, December 26, 1956. Application for reissue December 18, 1959, Serial No. 860,620

10 Claims. (Cl. 315—205)

Matter enclosed in heavy brackets [ ] appears in the original patent but forms no part of this reissue specification; matter printed in italics indicates the additions made by reissue.

This invention relates to circuits for starting and operating arc discharge devices and more particularly to a circuit for starting and operating an arc discharge device on direct current from a source of alternating current.

Arc discharge devices, such as mercury vapor lamps, are used for many purposes, such as indoor and outdoor lighting, photographic printing, etc. When alternating current power is available, these lamps are conventionally started and operated by an alternating current circuit; when only direct current power is available, they have been started and operated by direct current circuits. There are applications, however, such as an apparatus for sorting and inspecting punch cards, where the flickerless operation provided by direct current circuits is highly desirable, yet operation from a readily available alternating current source is desired. This requirement naturally dictates a circuit having self-contained rectifying elements for providing the direct current output.

It is well known that arc discharge devices have an inherent negative resistance characteristic; unless means are provided to limit current to a safe value, the device will destroy itself. In addition, certain types of arc discharge lamps require a relatively high voltage to strike the arc, i.e., start and thereafter operate at rated current at a much lower voltage. A circuit for starting and operating such a lamp must therefore provide not only the elevated starting voltage, but also the current limiting or ballasting action. In the case of alternating current circuits for starting and operating such lamps, this dual requirement is commonly provided by a high reactance step-up transformer having an open circuit secondary voltage sufficient to start the lamp and internal leakage reactance sufficient adequately to limit lamp current. If the circuit is to provide a direct current output, it would superficially appear that it would be necessary only to interpose a full wave rectifying and filtering circuit between the output of the transformer and the lamp. Such an arrangement may, in fact, suffice for lamps which do not have a great disparity between their striking and operating voltages. However, the rectifiers of such a circuit must withstand the alternating current open circuit secondary voltage if the lamp fails, and thus in cases where the lamp has a high ratio of starting to running voltage, rectifiers designed to withstand a voltage much higher than their normal operating voltage must be provided thereby adding substantially to the expense of the circuit. It is therefore desirable to provide a circuit for starting and operating arc discharge devices on direct current from a source of alternating current which provides the requisite starting voltage for the device but in which the rectifiers do not have to withstand the open circuit alternating current voltage.

It is therefore an object of this invention to provide an improved circuit for starting and operating an arc discharge device on direct current from a source of alternating current.

Another object of this invention is to provide an improved circuit for starting and operating an arc discharge device on direct current from a source of alternating current in which the rectifying elements do not have to withstand the open circuit secondary alternating current voltage.

Further objects and advantages of this invention will become apparent by reference to the following description and the accompanying drawing, and the features of novelty which characterize this invention will be pointed out with particularly in the claims annexed to and forming a part of this specification.

This invention in its broader aspects provides a circuit for starting and operating an arc discharge device on direct current from a source of alternating current having rectifying means and an accompanying filter circuit connected between the alternating current source and the arc discharge device for furnishing rectified direct current for operating the device, the filter circuit including a capacitor and an inductive reactor. Impedance means are arranged in circuit between the alternating current input and the output for ballasting the arc discharge device. In order to obtain the requisite starting voltage, another capacitor is provided connected in a modified half wave voltage doubling circuit with the filter capacitor and reactor and the rectifying means. This arrangement provides an elevated direct current voltage by voltage doubling action with superimposed alternating current peaks which is sufficient to start the lamp.

Figure 1:
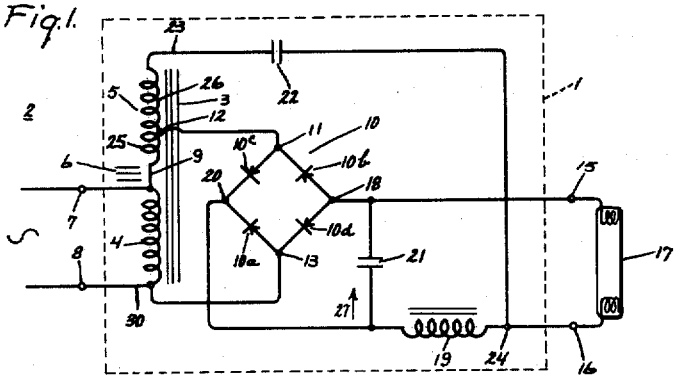
Fig. 1 is a schematic illustration of the improved circuit of this invention.

Referring now to Fig. 1, the improved starting and operating circuit 1 of this invention includes a high reactance transformer 2 having a core shown schematically at 3 on which is positioned a primary winding 4 and a secondary winding 5. The core 3 and the primary and secondary windings 4 and 5 together with a magnetic shunt, shown schematically at 6, are arranged to provide sufficient internal leakage reactance, as is well known in the art. Primary winding 4 is connected across a pair of input terminals 7 and 8 which are adapted to be connected to an external source of alternating current (not shown). One end 9 of secondary winding 5 of transformer 2 is connected to the end of primary winding 4 which is connected to input terminals 7 and thus it will be seen that primary winding 4 and secondary winding 5 are autotransformer connected.

A bridge rectifier 10 is provided having one of its input terminals 11 connected to a tap 12 on secondary winding 5 and its other input terminal 13 connected to the end 30 of primary winding 4 which is connected to input terminal 8. A pair of direct current output terminals 15 and 16 are provided to which are discharge device 17, such as a mercury vapor lamp is adapted to be connected. One output terminal 18 of bridge rectifier 10 is directly connected to output terminal 15 and inductive reactor 19 serially connects output terminal 16 and rectifier output terminal 20. A capacitor 21 is connected across rectifier output terminals 18 and 20 and it will now be seen that capacitor 21 and reactor 19 constitute a filter circuit between rectifier 10 and output terminals 15 and 16. Another capacitor 22 is connected between the end 23 of secondary winding 5 and point 24 between reactor 19 and output terminal 16.

The filter circuit comprising capacitor 21 and reactor 19 and bridge rectifier 10 supplies rectified filtered direct current for operating lamp 17, the portion 25 of secondary winding 5 defined between tap 12 and end 9 being selected to provide, with the primary winding 4, the desired operating voltage. Portion 26 of secondary winding 5 between tap 12 and end 23 together with capacitor 22, reactor 19, capacitor 21, and certain of the half wave rectifying elements of bridge rectifier 10 form a modified half wave voltage doubler circuit for providing the starting voltage for lamp 17 as will now be described.

Half wave voltage doubling circuits are well known in the art, being shown for example in United States Patent 2,072,278 to O. H. Schade. In the conventional voltage doubling circuit, a half wave rectifier and a capacitor are serially connected across a source of alternating current and another half wave rectifier and capacitor are serially connected across the first rectifier, the second rectifier being polarized oppositely from the first rectifier, and the load being connected across the second capacitor. In this circuit, during the first half cycle of applied voltage, current flows through the first rectifier and capacitor thereby charging the first capacitor. During the second half cycle, current flows through the second capacitor, the second rectifier and the first capacitor thereby adding the voltage across the first capacitor due to its previously required charge to the instantaneous applied voltage. The half wave voltage doubling circuit thus provides a rectified direct current output having a peak voltage substantially double the peak voltage of the applied alternating current source.

Considering now the circuit of Fig. 1, in the instantaneous condition when point 12 is more positive than the end 30 of primary winding 4, current will flow into input terminal 11 of rectifier 10, through the half wave rectifying element 10c, output terminal 20, through capacitor 21 in the direction shown by the arrow 27, output terminal 18, half wave rectifying element 10d, input terminal 13 and back to end 30. It is thus seen that during the first half cycle, capacitor 21 is charged to a potential of 1.4 the voltage across tap 12 and end 30 through half wave rectifiers 10c and 10d. Considering now the next half cycle during which point 12 is more positive than the end 23 of secondary winding 5, current will flow from point 12 to input terminal 11 of bridge rectifier 10, through half-wave rectifying element 10c, point 20, reactor 19, point 24, capacitor 22, and back to the end 23 of secondary winding 5 thus charging capacitor 22 to a potential of 1.4 the voltage across tap 12 and end 23. [Current will also flow from end 30 of primary winding 4 to input terminal 13, half-wave rectifier 10a, output terminal 20, capacitor 21, output terminal 18, rectifier 10b, input terminal 11 and back to tap 12. It is thus seen that during the second half cycle, current is still flowing through capacitor 21 responsive to the voltage between tap 12 and the end 30 of primary winding 4, however, this current is in the same direction as in the previous half cycle and thus capacitor 21 does not lose its initial charge.] During the third half-cycle when end 23 of secondary winding 5 is more positive than tap 12, current will flow from end 23 to capacitor 22, point 24, reactor 19, capacitor 21, output terminal 18, rectifier 10b, input terminal 11 and back to tap 12. It will now be seen that during this half cycle capacitor 22 discharges and recharges to a potential of 1.4 the voltage across tap 12 and end 23, the additional charge of 1.4 the voltage across tap 12 and end 23 being stored in capacitor 21 and the charging and discharging current of capacitor 22 flowing through reactor 19. On the fourth half cycle, capacitor 22 again discharges and recharges with the additional charge again being stored in capacitor 21. When the voltage across capacitor 21 reaches 1.4 the voltage across end 30 and tap 12 plus 2.8 the voltage across tap 12 and end 23, no more voltage is built up on capacitor 21 until some of the charge is drained off.

It is thus seen that a voltage doubling action occurs with an elevated voltage appearing across capacitor 21. In addition, it will be observed that the charging and discharging current of capacitor 22 flows through reactor 19 thus causing a succession of inductive kicks or voltage surges across reactor 19 due to the successive collapses of flux in the reactor core accompanying the reversals of current. It is thus seen that a voltage appears across output terminals 15 and 16 which is a direct current voltage provided by the voltage doubling action with a superimposed alternating current voltage caused by the inductive kicks in the reactor 19. It will of course be readily understood that the rectifiers do in fact have some backward leakage and thus the measured voltage across capacitor 21 will be less than the ideal value. This modified voltage doubling circuit therefore provides the elevated potential to start lamp 17, the requisite operating voltage being provided in the conventional manner by full wave rectifier 10 through the filter circuit comprising capacitor 21 and filter reactor 19. Since capacitor 22 remains in the circuit during lamp operation, and thus the charging and recharging action of capacitor 22 continues, the lamp current shown in Fig. 2 has superimposed peaks 28 as shown in Fig. 2.

Figure 2:
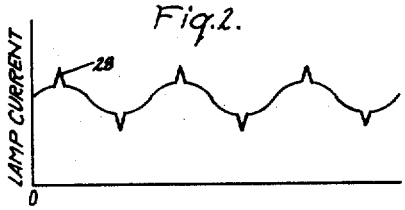
Fig. 2 shows the wave form of the lamp current provided by the circuit of Fig. 1.
Figure 3:
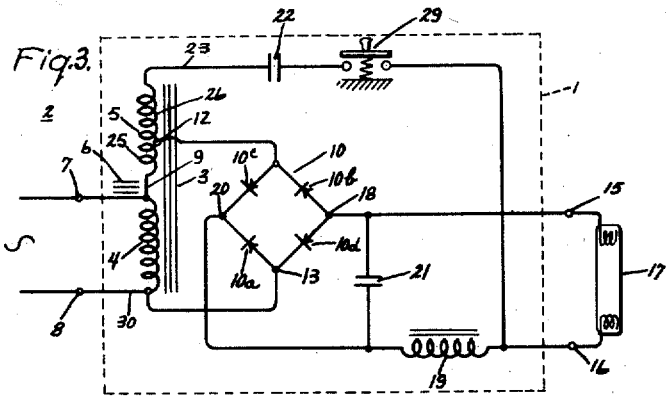
Fig. 3 is another schematic illustration showing the preferred embodiment of the improved circuit of this invention.
Figure 4:
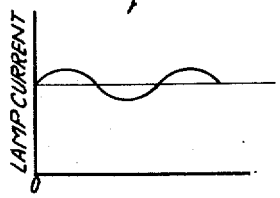
Fig. 4 shows the wave form of lamp current of the circuit of Fig. 3.

If the superimposed alternating current peaks 28 of Fig. 2 are considered to be undesirable during the lamp operation, the circuit of Fig. 1 may be simply modified as shown in Fig. 3 to include a manually actuated switch 29 in series with capacitor 22. Switch 29 is momentarily depressed to start the lamp, thereby inserting capacitor 22 in the circuit and providing the modified voltage doubling action, and is released after lamp 17 fires, thereby removing capacitor 22 from the circuit and eliminating the peaks 28 from the lamp current wave form as shown in Fig. 4.

It will readily be seen that this circuit possesses two important advantages over the more conventional circuit; by virtue of the modified voltage doubling action it is unnecessary to provide a transformer with sufficient open circuit secondary voltage to start the lamp and thus a considerable saving in iron and copper is effected, and the rectifiers need not withstand an open circuit voltage sufficient to strike the lamp thus effecting a further saving.

The capacitance and inductance values of capacitor 21 and reactor 19 respectively are preferably chosen to provide desired filtering action as is well known in the art. Capacitor 22, however, need not have the amount of capacitance which will ordinarily be provided in capacitor 21 since a relatively small amount of capacitance will provide the necessary voltage doubling action. Transformer 2 may be any conventional type of high reactance transformer with the necessary leakage provided either by spacing of the primary and secondary windings or by magnetic shunts as is well known in the art. While an auto-transformer connection of the primary winding 4 and the secondary winding 5 of transformer 2 has been shown, and will ordinarily be most economical isolated primary and secondary windings may be utilized. In addition, while dry-type rectifiers will ordinarily be employed in the bridge rectifier 10, obviously tube rectifiers may also be utilized.

A circuit in accordance with Fig. 3 has been constructed for operating a 100 watt mercury vapor lamp. This lamp requires a starting direct current voltage in excess of 700 volts and operates at rated current at 100 volts direct current. The circuit was designed for operation from a source of 118 volts, 60 cycle alternating current with the primary winding of the transformer having 285 turns of AWG No. 17 wire. The secondary winding between the end 9 and the tap 12 had 391 turns of AWG No. 20 wire and the remaining portion from the tap 12 to the end 23 had 194 turns of AWG No. 20 wire. With this arrangement, the open circuit voltage between the tap 12 and the end 30 of primary winding 4 was 254 R.M.S. volts, the open circuit voltage between tap 12 and end 23 of secondary winding 5 was 70 R.M.S. volts and the open circuit lamp starting voltage across the output terminals 15 and 16 was 350 direct current volts with switch 29 open. Capacitor 21 had a capacitance of 40 microfarads and capacitor 22 has a capacity of 2 microfarads with reactor 19 having an inductance of 2 henrys. Rectifier 10 was formed of selenium rectifying elements rated to withstand an inverse voltage of 260 R.M.S. volts.

It will now be readily apparent that this invention provides an improved circuit for starting and operating arc discharge devices on direct current from a source of alternating current, this circuit reducing the size of the transformer and the rating of the rectifiers from that required in previous circuits.

While I have illustrated and described a specific embodiment of this invention, further modifications and improvements will occur to those skilled in the art. I desire that it be understood therefore that this invention is not limited to the particular form shown and I intend in the appended claims to cover all modifications which do not depart from the spirit and scope of this invention.

What I claim as new and desire to secure by Letters Patent of the United States is:

1. A circuit for starting and operating an arc discharge device on direct current from a source of alternating current comprising an alternating current input circuit, rectifying means connected in circuit with said input circuit, a direct current output circuit, a filter circuit connected between said rectifying means and said output circuit for supplying rectified direct current to said output circuit, said filter circuit having at least one capacitor and an inductive reactor, impedance means connected in circuit between said input circuit and said output circuit for ballasting said arc discharge device during operation, means for obtaining an alternating current voltage responsive to the voltage across said input circuit, and another capacitor connected in circuit with said means for obtaining an alternating current voltage and said filter circuit and forming a half-wave voltage doubler circuit with said reactor, said first named capacitor and said rectifying means supplying an elevated rectified voltage with superimposed alternating current peaks to start said arc discharge device.

2. A circuit for starting and operating an arc discharge device on direct current from a source of alternating current comprising a pair of alternating current input terminals, inductive reactance means connected in circuit with said input terminals for ballasting said arc discharge device during operation, rectifying means connected in circuit with said inductive reactance means, a pair of direct current output terminals, a filter circuit connected between said rectifying means and said output terminals for supplying rectified direct current to said output terminals to operate said arc discharge device, said filter circuit having at least one parallel connected capacitor and a serially connected inductive reactor, means for obtaining an alternating current voltage responsive to the voltage across said input terminals, and another capacitor connected in circuit with said means for obtaining an alternating current voltage and said filter circuit and forming a half wave voltage doubler circuit with said reactor, said first named capacitor and said rectifying means supplying an elevated rectified voltage with superimposed alternating current peaks to start said arc discharge device.

3. A circuit for starting and operating an arc discharge device on direct current from a source of alternating current comprising a pair of alternating current input terminals, inductive reactance means connected in circuit with said input terminals for ballasting said arc discharge device during operation, a bridge rectifier having its input connected in circuit with said inductive reactance means, a pair of direct current output terminals, one side of the output of said rectifier being connected to one of said output terminals, an inductive reactor serially connecting the other side of the output of said rectifier to the other of said output terminals, a first capacitor connected across the output of said rectifier and forming a filter circuit with said reactor for supplying rectified direct current to said output terminals to operate said arc discharge device, means for obtaining an alternating current voltage responsive to the voltage across said input terminals, and another capacitor connected between said means for obtaining an alternating current voltage and said other output terminal and forming a half-wave voltage doubler circuit with said reactor, said first capacitor, and said bridge rectifier supplying an elevated rectified voltage with superimposed alternating current peaks to start said arc discharge device.

4. A circuit for starting and operating an arc discharge device on direct current from a source of alternating current comprising a pair of alternating current input terminals, means including a transformer having a primary winding and a secondary winding, said primary winding being connected across said input terminals, said means having sufficient reactance therein for ballasting said arc discharge device during operation, rectifying means connected in circuit with at least a part of said secondary winding, a pair of direct current output terminals, a filter circuit connected between said rectifying means and said output terminal for supplying rectified direct current to said output terminals to operate said arc discharge device, said filter circuit having at least one parallel connected capacitor and a serially connected inductive reactor, means for obtaining an alternating current voltage responsive to the voltage across said input terminals, and another capacitor connected in circuit with said means for obtaining an alternating current voltage and said filter circuit and forming a half wave voltage doubler circuit with said reactor, said first named capacitor and said rectifying means supplying an elevated rectified voltage with superimposed alternating current peaks to start said arc discharge device.

5. A circuit for starting and operating an arc discharge device on direct current from a source of alternating current comprising a pair of alternating current input terminals, means including a transformer having a primary winding and a secondary winding, said primary winding being connected across said input terminals, said means having sufficient reactance therein for ballasting said arc discharge device during operation, a bridge rectifier having its input connected across at least a part of said secondary winding, a pair of direct current output terminals, one side of the output of said rectifier being connected to one of said output terminals, an inductive reactor serially connecting the other side of the output of said rectifier to the other of said output terminals, a first capacitor connected across the output of said rectifier and forming a filter circuit with said reactor for supplying rectified direct current to said output terminals to operate said arc discharge device, means for obtaining an alternating current voltage in response to the voltage across said input terminals, and another capacitor connected between said means for obtaining an alternating current voltage and said other output terminal and forming a half-wave voltage doubler circuit with said reactor, said first capacitor, and said bridge rectifier supplying an elevated rectified voltage with superimposed alternating current peaks to start said arc discharge device.

6. A circuit for starting and operating an arc discharge device on direct current from a source of alternating current comprising a pair of alternating current input terminals, a high reactance transformer having a primary winding and first and second secondary windings, said primary winding being connected across said input terminals, rectifying means connected in circuit with said first secondary winding, a pair of direct current output terminals, a filter circuit connected between said rectifying means and said output terminals for supplying rectified direct current to said output terminals to operate said arc discharge device, said filter circuit having at least one parallel connected capacitor and a serially connected inductive reactor, and another capacitor connected in circuit between said second secondary winding and said filter circuit and forming a half wave voltage doubler circuit with said reactor, said first named capacitor and said rectifying means supplying an elevated rectified voltage with superimposed alternating current peaks to start said arc discharge device.

7. A circuit for starting and operating an arc discharge device on direct current from a source of alternating current comprising a pair of alternating current input terminals, a high reactance transformer having a primary winding and first and second secondary windings, said primary winding being connected across said input terminals, a bridge rectifier having its input connected across said first secondary winding, a pair of direct current output terminals, one side of the output of said rectifier being connected to one of said output terminals, an inductive reactor serially connecting the other side of the otuput of said rectifier to the other of said output terminals, a first capacitor connected across the output of said rectifier and forming a filter circuit with said reactor for supplying rectified direct current to said output terminals to operate said arc discharge device, and another capacitor connected between said second secondary winding and said other output terminal and forming a half-wave voltage doubler circuit with said reactor, said first capacitor, and said bridge rectifier supplying an elevated rectified voltage with superimposed alternating current peaks to start said arc discharge device.

8. A circuit for starting and operating an arc discharge device on direct current from a source of alternating current comprising a pair of alternating current input terminals, a high reactance transformer having a primary winding and an autotransformer connected secondary winding, said primary winding being connected across said input terminals, a bridge rectifier having its input connected across a part of said secondary winding, a pair of direct current output terminals, one side of the output of said rectifier being connected to one of said output terminals, an inductive recator serially connecting the other side of the output of said rectifier to the other of said output terminals, a first capacitor connected across the output of said rectifier and forming a filter circuit with said reactor for supplying rectified direct current to said output terminals to operate said arc discharge device, another capacitor connected between another part of said secondary winding and said other output terminal and forming a half-wave voltage doubler circuit for said reactor, said first capacitor and said bridge rectifier supplying an elevated rectified voltage with superimposed alternating current peaks to start said arc discharge device.

9. A circuit for starting and operating an arc discharge device on direct current from a source of alternating current comprising an alternating current input circuit, rectifying means connected in circuit with said input circuit, a direct current output circuit, a filter circuit connected between said rectifying means and said output circuit for supplying rectified direct current to said output circuit, said filter circuit having at least one capacitor and an inductive reactor, impedance means connected in circuit between said input circuit and said output circuit for ballasting said arc discharge device during operation, means for obtaining an alternating current voltage responsive to the voltage across said input circuit, another capacitor connected in circuit with said means for obtaining an alternating current voltage and said filter circuit and forming a half-wave voltage doubler circuit with said reactor, said first named capacitor and said rectifying means for supplying an elevated rectified voltage with superimposed alternating current peaks to start said arc discharge device, and switch means in circuit with said other capacitor and arranged momentarily to connect said other capacitor in said voltage doubling circuit for starting said arc discharge device and thereafter to disconnect said other capacitor during operation of said arc discharge device.

10. A circuit for starting and operating an arc discharge device on direct current from a source of alternating current comprising a pair of alternating current input terminals, a high reactance transformer having a primary winding and an autotransformer connected secondary winding, said primary winding being connected across said input terminals, a bridge rectifier having its input connected across a part of said secondary winding, a pair of direct current output terminals, one side of the output of said rectifier being connected to one of said output terminals, an inductive reactor serially connecting the other side of the output of said rectifier to the other of said output terminals, a first capacitor connected across the output of said rectifier and forming a filter circuit with said reactor for supplying rectified direct current to said output terminals to operate said arc discharge device, another capacitor connected between another part of said secondary winding and said other output terminal and forming a half-wave voltage doubler circuit with said reactor, said first capacitor and said bridge recitfier for supplying an elevated rectified voltage with superimposed alternating current peaks to start said arc discharge device, and a manually actuated switch connected in series with said other capacitor for momentarily connecting said other capacitor in said voltage doubling circuit to start said arc discharge device and thereafter for disconnecting said other capacitor during operation of said arc discharge device.

References Cited in the file of this patent or the original patent

UNITED STATES PATENTS

| | | |
|---|---|---|
| 1,874,428 | Bird | Aug. 30, 1932 |
| 2,628,331 | Rockafellow | Feb. 10, 1953 |
| 2,738,443 | Danzider | Mar. 13, 1956 |
| 2,757,318 | Noel | July 31, 1956 |
| 2,799,809 | Lautenberger | July 16, 1957 |
| 2,804,588 | Hjermstad | Aug. 27, 1957 |